United States Patent
Fujita et al.

(10) Patent No.: US 8,328,547 B2
(45) Date of Patent: Dec. 11, 2012

(54) INJECTION FOAM MOLDING MACHINE AND METHOD OF INJECTION FOAM MOLDING

(75) Inventors: Saburo Fujita, Aichi (JP); Yasuaki Ozeki, Aichi (JP)

(73) Assignee: Mitsubishi Heavy Industries Plastic Technology Co., Ltd., Nagoya-shi, Aichi (JP)

( * ) Notice: Subject to any disclaimer, the term of this patent is extended or adjusted under 35 U.S.C. 154(b) by 485 days.

(21) Appl. No.: 12/599,568

(22) PCT Filed: Jan. 24, 2008

(86) PCT No.: PCT/JP2008/050976
§ 371 (c)(1),
(2), (4) Date: Nov. 10, 2009

(87) PCT Pub. No.: WO2008/139751
PCT Pub. Date: Nov. 20, 2008

(65) Prior Publication Data
US 2010/0237525 A1 Sep. 23, 2010

(30) Foreign Application Priority Data
May 11, 2007 (JP) ................. 2007-127407

(51) Int. Cl.
*B29C 44/02* (2006.01)
*B29C 45/67* (2006.01)
*B29C 45/77* (2006.01)
*B29C 45/80* (2006.01)

(52) U.S. Cl. ........ 425/150; 425/589; 425/590; 264/45.2

(58) Field of Classification Search .................. 264/45.2; 425/150, 589, 590, 594, 595
See application file for complete search history.

(56) References Cited

U.S. PATENT DOCUMENTS

| | | | |
|---|---|---|---|
| 2005/0281908 A1* | 12/2005 | Tsuji et al. | 425/595 |
| 2006/0246172 A1 | 11/2006 | Koike et al. | |

FOREIGN PATENT DOCUMENTS

| | | |
|---|---|---|
| JP | 52-25429 A | 2/1977 |
| JP | 2002-321262 A | 11/2002 |
| JP | 2004-098582 A | 4/2004 |
| JP | 2005-342935 A | 12/2005 |
| JP | 2006-289861 A | 10/2006 |
| JP | 2006-334793 A | 12/2006 |

OTHER PUBLICATIONS

International Search Report of PCT/JP2008/050976, mailing date of Apr. 8, 2008.

* cited by examiner

*Primary Examiner* — Joseph Del Sole
*Assistant Examiner* — Ryan Ochylski
(74) *Attorney, Agent, or Firm* — Westerman, Hattori, Daniels & Adrian, LLP

(57) ABSTRACT

An injection foam molding machine according to the present invention includes: a clamping unit that moves a movable die plate 3 relative to a fixed die plate 2 to clamp the die plates; a fixed side mold attached to the fixed die plate 2; a movable side mold attached to the movable die plate 3; a plurality of drive units 50 that widen an interval between both of the die plates 2 and 3; and a die-plate-interval adjusting unit 60 that adjusts a distance over which the movable die plate 3 is moved by the drive units 50, and when a molten foam resin is foamed, an inner-side interval within the mold cavity is determined, and thus an accurate molded product can be obtained.

14 Claims, 6 Drawing Sheets

INJECTION FOAM MOLDING MACHINE AND METHOD OF INJECTION FOAM MOLDING

TECHNICAL FIELD

The present invention relates to a configuration of an injection foam molding machine that slightly opens a mold to foam a foamable molten resin injected and filled within a mold cavity to obtain a highly accurate foam-molded product, and to a method of foam molding.

BACKGROUND ART

In injection foam molding performed by an injection molding machine, for the purposes of obtaining a light and durable molded product with a good appearance, a top surface is cured and then its interior is foamed. To achieve this, there is conventionally known an injection foam molding method in which a foamable resin that is plasticized by heating is injected and filled within a mold at high speed, the top surface of the molded product contacting the mold is cooled and cured after completion of injecting and filling, and thereafter, the volume of a mold cavity is enlarged by widening a mold interval to decrease an internal pressure of the molded product, thereby foaming and expanding the interior of the molded product.

A foamable-resin molding device is described with reference to a conventional example in Patent Document 1. In this molding device, a hydraulic cylinder different from a clamping hydraulic cylinder is provided on a fixed board to widen a mold interval, and after the top surface of a molded product is cooled and cured, the hydraulic cylinder is activated from a state that the mold is closely adhered, thereby widening the mold interval by a foaming and expanding amount of a resin. This molding device includes a unit that adjusts a stroke of the hydraulic cylinder and a unit that precisely sets a leading-end position of a protruding rod fixed on a movable board abutted to an activating rod end of the hydraulic cylinder.

According to a foamable-resin molding device in a conventional example described in Patent Document 2, it is molded such that in a foam-molding injection molding machine in which after a resin mixed with a foaming agent is injected in a cavity formed between a fixed mold provided on a fixed board and a movable mold provided on a movable board, the movable mold is moved by a predetermined distance in a mold-opening direction in response to foaming of the resin that is mixed with a foaming agent, a movable mold-moving mechanism that can be abutted to and be spaced from an alternate one of the movable platen and the fixed board by using a servo motor and a screw is provided at one of the movable platen and the fixed platen. An object of this molding device is to obtain a high-quality foam-molded product by highly accurately controlling the speed when moving the movable mold in a mold-opening direction and its stop position in response to foaming of the resin that is mixed with a foaming agent.

In a foamable-resin molding device in a conventional example described in Patent Document 3, when foaming a molten resin injected and filled in a mold cavity by slightly opening a mold, slight-opening speed is controlled such that an in-mold pressure detected by an in-mold pressure sensor does not reach a minus value, drive of slightly opening a mold during foaming employs a plurality of ball screw type jacks, and a servo motor that drives the jacks is tuning-controlled, thereby making the thickness of molded products even.

Patent Document 1: Japanese Patent Application Publication No. S52-25429 (FIGS. 1 and 3)
Patent Document 2: Japanese Patent Application Laid-open No. 2002-321262 (FIG. 4)
Patent Document 3: Japanese Patent Application Laid-open No. 2004-98582 (FIG. 1)

DISCLOSURE OF INVENTION

Problem to be Solved by the Invention

In the conventional example in Patent Document 1, in a position adjusting unit that receives a thrust of a stroke adjusting unit of a hydraulic cylinder, a nut and a screw rod are turned via a bevel gear and a worm gear from a drive source. However, backlashes of meshing of gears overlap, and thus it is difficult to correctly align positions at which strokes of a plurality of hydraulic cylinders are received, and when the hydraulic cylinder is rapidly driven, expanding speed of a foamable resin becomes unable to follow retracting speed of a mold, thereby generating a gap between the mold and a molded product. This causes generation of a swirl mark or silver.

Further, in the conventional examples shown in Patent Documents 2 and 3, the accuracy for a moving distance of the mold is sufficiently high and moving speed is appropriately controlled. Thus, no gap is generated between a mold and a molded product. Accordingly, there is no concern as to the generation of a swirl mark or silver. However, to accurately drive a very heavy die plate, a ball screw unit having a large capacity is needed, and thus the facility becomes considerably expensive.

Means for Solving Problem

According to an aspect of the present invention, in a first invention, an injection foam molding machine including: a clamping unit that moves a movable die plate relative to a fixed die plate and clamps the die plates; a fixed side mold attached to the fixed die plate; a movable side mold attached to the movable die plate; a plurality of drive units that widen an interval between the die plates; and a die-plate-interval adjusting unit that adjusts a distance over which the movable die plate is moved by the drive units, in which the drive units, which are hydraulic cylinders that drive a ram to an activation end, are fixed to the fixed die plate or the movable die plate, the die-plate-interval adjusting unit is fixedly provided on an alternate one of the die plates at a position facing the drive units, and an adjustment end of the interval adjusting unit is abutted to a leading end of an activating rod of the hydraulic cylinders of the drive units, thereby determining the interval between both of the die plates.

Advantageously, in the injection foam molding machine according to a third invention, the die-plate-interval adjusting unit includes: a screw shaft support frame fixed to one of the die plates on which the drive units are not attached; a trapezoidal screw shaft that is rotatably supported by the screw shaft support frame, constrained in a center-line direction, and includes a trapezoidal screw; and a trapezoidal screw nut that has a surface abutted to the leading end of the activating rod of the hydraulic cylinder, includes a trapezoid-shaped female screw screwed to the trapezoidal screw of the screw shaft, and is provided with a detent.

Advantageously, in the injection foam molding machine according to a forth invention, the drive units, which are hydraulic cylinders with which a ram is driven to an activation end, are fixed to one of the fixed die plate and the movable die plate, the die-plate-interval adjusting unit is fixedly provided on the other die plates at a position facing the drive units, and an adjustment end of the interval adjusting unit is abutted to a leading end of an activating rod of the hydraulic cylinders of the drive units, thereby determining the interval between both of the die plates is determined, and the die-plate-interval adjusting unit includes: a screw shaft support frame fixed to a die plate on which the drive units are not attached; a trapezoidal screw shaft that is rotatably supported by the screw shaft support frame, constrained in a center-line direction, and includes a trapezoidal screw; and a trapezoidal screw nut that has a surface abutted to the leading end of the activating rod of the hydraulic cylinder, includes a trapezoid-shaped female screw screwed into the trapezoidal screw of the screw shaft, and is provided with a detent.

Advantageously, in the injection foam molding machine according to a fifth invention, the drive units, which are hydraulic cylinders with which a ram is driven to an activation end, are fixed to one of the fixed die plate and the movable die plate, the die-plate-interval adjusting unit is fixedly provided on the other die plates at a position facing the drive units, and an adjustment end of the interval adjusting unit is abutted to a leading end of an activating rod of the hydraulic cylinders of the drive units, thereby determining the interval between both of the die plates is determined, and the die-plate-interval adjusting unit includes: a screw nut support frame fixed to a die plate on which the drive units are not attached; a trapezoidal screw nut that is rotatably supported by the screw nut support frame, constrained in a center-line direction, and includes a trapezoidal screw; and a trapezoidal screw shaft that has a surface abutted to the leading end of the activating rod of the hydraulic cylinder, includes a trapezoid-shaped male screw screwed into the trapezoidal screw of the screw nut, and is provided with a detent.

Advantageously, in the injection foam molding machine according to a sixth invention, the die-plate-interval adjusting unit includes: a screw shaft support frame fixed to a die plate on which the drive units are not attached; a trapezoidal screw shaft that is rotatably supported by the screw shaft support frame, constrained in a center-line direction, and includes a trapezoidal screw; and a trapezoidal screw nut that has a surface abutted to the leading end of the activating rod of the hydraulic cylinder, includes a trapezoid-shaped female screw screwed into the trapezoidal screw of the screw shaft, and is provided with a detent, and in the interval adjusting unit that adjusts the interval between both of the die plates, a servo motor that rotates and drives the trapezoidal screw shaft is provided.

Advantageously, in the injection foam molding machine according to a seventh invention, the die-plate-interval adjusting unit includes: a screw nut support frame fixed to a die plate on which the drive units are not attached; a trapezoidal screw nut that is rotatably supported by the screw nut support frame, constrained in a center-line direction, and includes a trapezoidal screw; and a trapezoidal screw shaft that has a surface abutted to the leading end of the activating rod of the hydraulic cylinder, includes a trapezoid-shaped male screw screwed into the trapezoidal screw of the screw nut, and is provided with a detent, and in the interval adjusting unit that adjusts the interval between both of the die plates, a servo motor that rotates and drives the trapezoidal screw shaft is provided.

Advantageously, the injection foam molding machine according to an eighth invention, includes: a fixed die plate fixed to a base; a movable die plate movable on the base relative to the fixed die plate; a movable-die-plate moving unit that reciprocally moves the movable die plate; a plurality of hydraulic clamping cylinders adjunctly attached to the fixed die plate; a plurality of drive units capable of widening an interval between both of the die plates after clamping the movable die plate by supplying a low hydraulic pressure to a small sub-cylinder provided in a clamping cylinder to eliminate a play of a half nut that supports a pulling force of a tie bar that clamps both of the die plates; and a plurality of die-plate-interval adjusting units that adjust a distance over which the movable die plate is moved by the drive units. The drive units, which are hydraulic cylinders with which a ram is driven to an activation end, are fixed to the fixed die plate or the movable die plate, the die-plate-interval adjusting unit is fixedly provided on an alternate one of the die plates at a position facing the drive units, and an adjustment end of the interval adjusting unit is abutted to a leading end of an activating rod of the hydraulic cylinders of the drive units, thereby determining the interval between both of the die plates is determined, and each of the die-plate-interval adjusting unit includes: a screw shaft support frame fixed to a die plate on which the drive units are not attached; a trapezoidal screw shaft that is rotatably supported by the screw shaft support frame, constrained in a center-line direction, and includes a trapezoidal screw; and a trapezoidal screw nut that has a surface abutted to the leading end of the activating rod of the hydraulic cylinder, includes a trapezoid-shaped female screw screwed into the trapezoidal screw of the screw shaft, and is provided with a detent.

Advantageously, the injection foam molding machine according to a ninth invention, includes: a fixed die plate fixed to a base; a movable die plate movable on the base relative to the fixed die plate; a movable-die-plate moving unit that reciprocally moves the movable die plate; a plurality of hydraulic clamping cylinders adjunctly attached to the fixed die plate; a plurality of drive units capable of widening an interval between both of the die plates after clamping the movable die plate by supplying a low hydraulic pressure to a small sub-cylinder provided in a clamping cylinder to eliminate a play of a half nut that supports a pulling force of a tie bar that clamps both of the die plates; and a plurality of die-plate-interval adjusting units that adjust a distance over which the movable die plate is moved by the drive units. The drive units, which are hydraulic cylinders with which a ram is driven to an activation end, are fixed to the fixed die plate or the movable die plate, the die-plate-interval adjusting unit is fixedly provided on an alternate one of the die plates at a position facing the drive units, and an adjustment end of the interval adjusting unit is abutted to a leading end of an activating rod of the hydraulic cylinders of the drive units, thereby determining the interval between both of the die plates is determined, and each of the die-plate-interval adjusting unit includes: a screw nut support frame fixed to a die plate on which the drive units are not attached; a trapezoidal screw nut that is rotatably supported by the screw nut support frame, constrained in a center-line direction, and includes a trapezoidal screw; and a trapezoidal screw nut that has a surface abutted to the leading end of the activating rod of the hydraulic cylinder, includes a trapezoid-shaped male screw screwed into the trapezoidal screw of the screw nut, and is provided with a detent.

Advantageously, in the injection foam molding machine according to a tenth invention, the a plurality of position sensors that detect a distance between a mold attaching surface of the die plate according to the first invention and a leading end surface of a trapezoid-shaped female screw of a plurality of interval adjusting units are provided; and a value of the detection is displayed on a display panel.

According to another aspect of the present invention, an injection foam molding method in a eleventh invention, includes: a process of injecting and filling a molten resin within a mold cavity formed between a fixed side mold and a movable side mold using the injection foam molding machine according to the eighth invention; and a process of moving the movable side mold in a direction from which the fixed side mold is separated after the process of injecting and filling.

Advantageously, in an injection foam molding method according to a twelfth invention, include: a process of injecting and filling a molten resin within a mold cavity formed between a fixed side mold and a movable side mold using the injection foam molding machine according to the ninth invention; and a process of moving the movable side mold in a direction from which the fixed side mold is separated after the process of injecting and filling.

Advantageously, in an injection foam molding method according to a thirteenth invention, in which by using the injection foam molding machine according to the eighteenth invention, a foamable resin compressed by plasticizing by melting within a mold cavity that has been clamped is injected and filled, and thereafter a resin pressure is decreased, and a volume of the mold cavity is increased to mold a foam-molded product. After injecting and filling the foamable resin, when hydraulic cylinders of the drive units are driven to press a pressing surface of a trapezoidal screw nut of the interval adjusting unit, activation speed of the hydraulic cylinders is controlled such that expanding speed of foaming and molding of a resin is not exceeded, a movable die plate moves over a distance adjusted and set by the interval adjusting unit and stops, and subsequent to ending foaming, foam pressure holding, cooling, pressure decreasing, and mold-releasing are performed.

Advantageously, in an injection foam molding method according to a fourteenth invention, in which by using the injection foam molding machine according to the ninth invention, a foamable resin compressed by plasticizing by melting within a mold cavity that has been clamped is injected and filled, and thereafter a resin pressure is decreased, and a volume of the mold cavity is increased to mold a foam-molded product. After injecting and filling the foamable resin, when hydraulic cylinders of the drive units are driven to press a pressing surface of a trapezoidal screw shaft of the interval adjusting unit, activation speed of the hydraulic cylinders is controlled such that expanding speed of foaming and molding of a resin is not exceeded, a movable die plate moves over a distance adjusted and set by the interval adjusting unit and stops, and subsequent to ending foaming, foam pressure holding, cooling, pressure decreasing, and mold-releasing are performed.

Advantageously, in an injection foam molding method according to a fifteenth invention, includes: a process of injecting and filling a molten resin within a mold cavity formed between a fixed side mold and a movable side mold using the injection foam molding machine according to the eighteenth invention; and a process of moving the movable side mold in a direction from which the fixed side mold is separated after the process of injecting and filling. An in-mold pressure sensor that detects a molten resin pressure within the mold cavity is provided and an activation hydraulic pressure of a hydraulic cylinder of the drive unit is controlled such that an in-mold pressure during a resin foam-molding process within the mold cavity does not become a negative pressure.

Advantageously, an injection foam molding method according to a sixteenth invention, includes: a process of injecting and filling a molten resin within a mold cavity formed between a fixed side mold and a movable side mold using the injection foam molding machine according to the ninth invention; and a process of moving the movable side mold in a direction from which the fixed side mold is separated after the process of injecting and filling. An in-mold pressure sensor that detects a molten resin pressure within the mold cavity is provided and an activation hydraulic pressure of a hydraulic cylinder of the drive unit is controlled such that an in-mold pressure during a resin foam-molding process within the mold cavity does not become a negative pressure.

Effect of the Invention

According to an injection foam molding method using the injection-foam molding device of the present invention, when foaming a molten foamable resin injected and filled in a mold cavity by slightly opening (core back) it in a mold, a hydraulic cylinder as a drive unit that widens an interval between both of the die plates is controlled in activation speed so that it is driven to an activation end in a manner that expanding speed of a resin foam molding is not exceeded, thereby pressing against the trapezoidal screw nut or the trapezoidal screw shaft of an interval adjusting unit of which the position is previously set, and as a result, the movable die plate moves for an adjusted and set distance of the interval adjusting unit, and thus the inner-side interval of the mold cavity is determined. This provides an accurate molded product.

When slightly opening the mold, to eliminate a play of a half nut that supports the pulling force of a clamping tie bar, both die plates are pulled by a force smaller than that of a core-back cylinder by supplying a low hydraulic pressure to a sub-cylinder having a smaller radius that is provided in a clamping cylinder. This provides effects of a high reproducibility of a distance set between the die plates and of obtaining a molded product having a high accuracy.

Further, there is provided a position sensor that detects a distance between a mold attaching surface and a leading-end surface of a trapezoid-shaped female screw of an interval adjusting unit, and its detection value is displayed on a display panel. Therefore, it becomes possible to check an inner-side interval of a cavity at any time, and thus the interval adjusting unit can be easily readjusted even when a change with time is generated.

Moreover, during a resin foam-molding process, a molten resin pressure within a mold cavity is detected by an in-mold pressure sensor and an activation hydraulic pressure of a hydraulic cylinder of a drive unit is controlled such that the in-mold pressure does not become a negative pressure. Accordingly, there is an effect of suppressing the generation of a swirl mark (foam gas trace) or silver (silver streak mark) on the top surface of a molded product.

Figure 1:
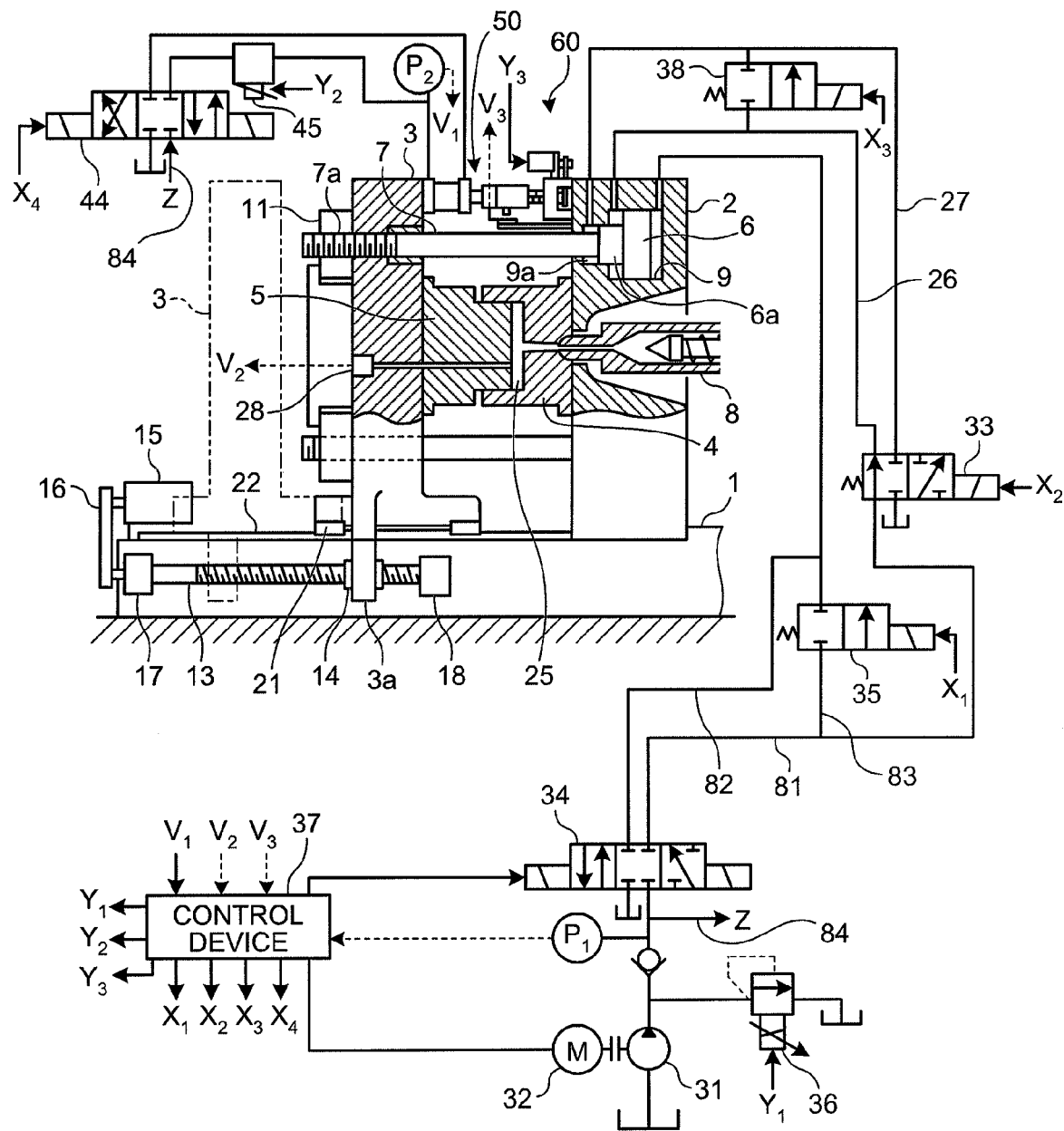
FIG. 1 is a side view and a hydraulic-control system diagram of an injection-foam molding device according to a first embodiment of the present invention.

EXPLANATIONS OF LETTERS OR NUMERALS 2 fixed die plate
3 movable die plate
4 fixed side mold
5 movable side mold
6 ram
7 tie bar
9 clamping cylinder
11 half nut
25 cavity
33 three-direction switching valve
34, 44 four-direction switching valve
35, 38 on/off valve
36 electromagnetic-proportional-control relief valve
37 control device
45 hydraulic adjusting valve
50 drive unit
51 hydraulic cylinder for core back
54 activating rod
55 rod end piece
60, 80 die-piece-interval adjusting unit
62, 103 trapezoidal screw shaft
63, 85 trapezoidal screw nut
64 nut end piece
68 servo motor
73 position sensor
85 trapezoidal screw nut
101 screw nut support frame
102 partition table
103 trapezoidal screw shaft
104 screw shaft end piece

BEST MODE(S) FOR CARRYING OUT THE INVENTION

Exemplary embodiments of the present invention are made applicable to foam molding by adding functional components to a hydraulic-clamping injection molding machine.

First Embodiment

A first embodiment is explained with reference to the accompanying drawings.

Figure 2:
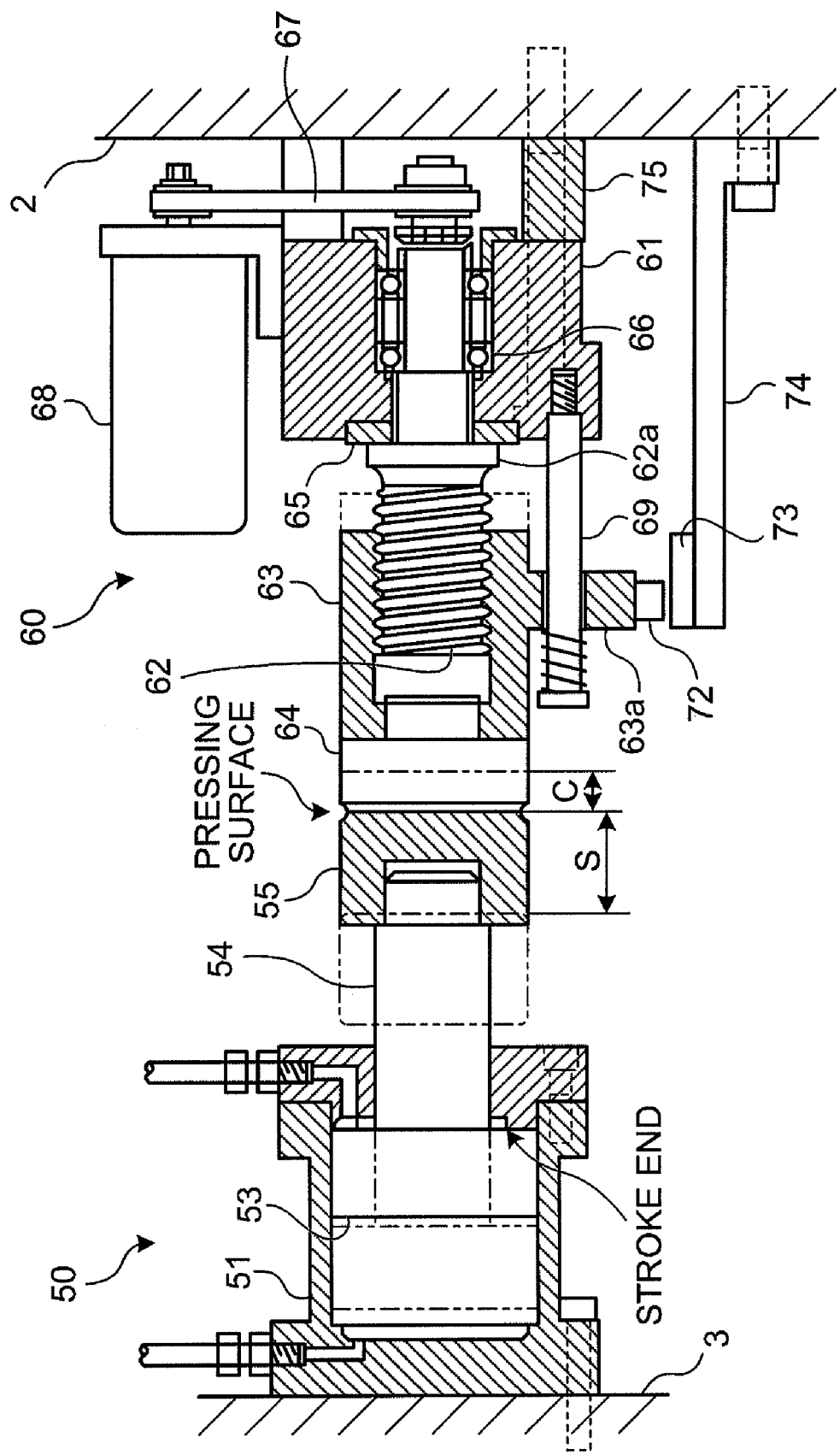
FIG. 2 is an enlarged view of a drive unit formed by a hydraulic cylinder for a core back in FIG. 1 and a die-plate-interval adjusting unit.
Figure 3:
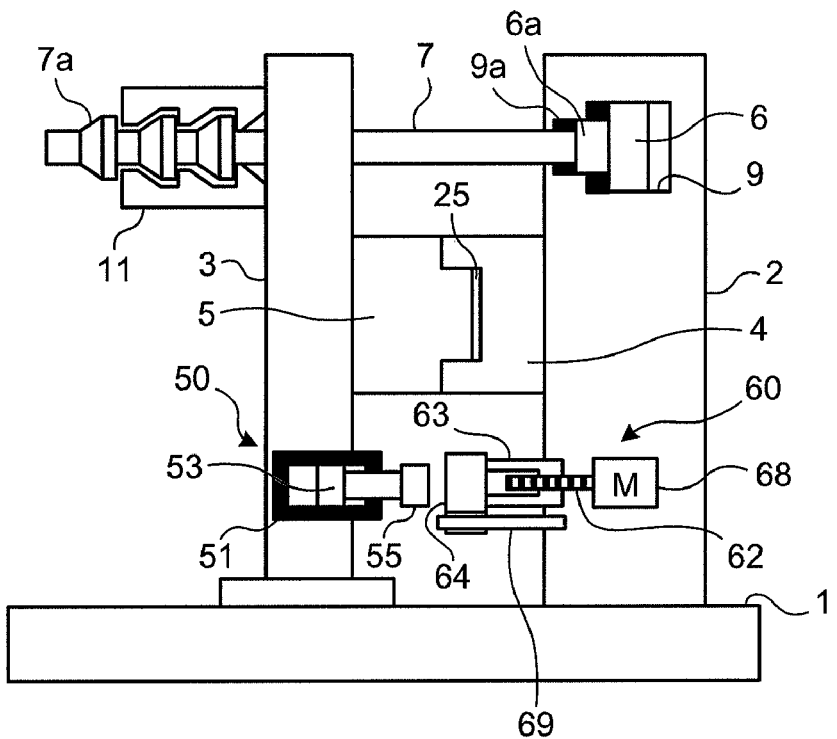
FIG. 3 depicts a core-back operation in a foaming and expanding process of the injection-foam molding device in FIG. 1 (Process I).

FIG. 1 is a side view and a hydraulic-control system diagram of an injection-foam molding device according to the present invention, FIG. 2 is an enlarged view of a drive unit formed by a hydraulic cylinder for a core back in FIG. 1 and a die-plate-interval adjusting unit, and FIG. 3 depicts a core-back operation in a foaming and expanding process of the injection-foam molding device in FIG. 1.

In these drawings, reference numeral 1 denotes a base, and at one end of which is fixed with a fixed die plate 2 attached with a fixed side mold 4. On the base 1, a movable die plate 3 attached with a movable side mold is movably mounted to face the fixed die plate 2. Reference numeral 22 denotes a guide rail fixed along the base 1. A linear bearing 21 fixed on the movable die plate 3 is guided by the guide rail 22 to support the movable die plate 3. On the fixed die plate 2, a plurality of (four in this embodiment) clamping cylinders 9 each having a short stroke and a large cross section are provided symmetrically with respect to a center line of the fixed die plate 2.

Rams 6 sliding in the clamping cylinders 9 are directly connected to respective tie bars 7 on one side surfaces, and when the movable die plate 3 facing the fixed die plate 2 approaches to close the mold, the tie bars 7 penetrate a plurality of through holes opened in the movable die plate 3. Sub-cylinders 9a of which the inner radius is smaller by one level are provided on a clamping side of the clamping cylinders, and the rams 6 are provided with sub-rams 6a inserted through the sub-cylinders 9a.

Leading end portions of the tie bars 7 form a plurality of grooves 7a that are equally pitched. Meanwhile, on a side surface reverse to the mold of the movable die plate 3, a plurality of half nuts 11 that are meshed with ring grooves 7a of the respective tie bars 7 and that face the ring grooves 7a to form a pair are provided such that they move in a direction perpendicular to axes of the tie bars 7 by a hydraulic cylinder or the like to sandwich and fix the tie bars 7. Reference numeral 8 denotes an injection cylinder.

A drive unit 50 and a die-plate-interval adjusting unit 60 that slightly open an interval between the fixed die plate 2 and the movable die plate 3 during foam molding are described. As shown in FIG. 2, in the present embodiment, a plurality (four sets) of hydraulic cylinders 51 for a core back, which is a main unit of the drive unit 50, are fixed at symmetrical positions on a surface facing the fixed die plate 2 of the movable die plate 3. Rams 53 of the hydraulic cylinders 51 for a core back are driven by a predetermined distance (s) to an activation end of the hydraulic cylinders 51. The die-plate-interval adjusting unit 60 is fixed at a position facing the drive unit 50 on a surface of the fixed die plate 2. A nut end piece 64 at a leading end of the die-plate-interval adjusting unit 60 is abutted to a rod end piece 55 at a leading end of an activating rod 54 of each of the hydraulic cylinders 51 for a core back and when it is further pressed, each of the rams 53 of the hydraulic cylinder 51 is stopped at an activation end of the hydraulic cylinder 51. In this way, the interval between both of the die plates is determined.

The die-plate-interval adjusting unit 60 is configured by: a screw shaft support frame 61 fixed via a trapezoidal screw nut 63 and a partition table 75; a trapezoidal screw shaft 62 that is rotatably supported via a bearing 66 by the screw shaft support frame 61 that is constrained in a center-line direction and includes trapezoidal screws; the trapezoidal screw nut 63 that has a surface abutted to the rod end piece 55 at the leading end of the activating rod 54 of the hydraulic cylinder 51 for a core back and that includes trapezoid-shaped female screws screwed into the trapezoidal screws of the trapezoidal screw shaft 62; the nut end piece 64 that is fitted into the leading end of the trapezoidal screw nut 63; a plurality of detents 69 of the trapezoidal screw nut 63, which are attached to the fixed die plate 2 symmetrically with respect to a center line of the trapezoidal screw nut 63; and a servo motor 68 that rotates and drives the trapezoidal screw shaft 62 via a toothed belt 67. Reference letter c shown in FIG. 2 indicates an interval adjusting range of the die-plate-interval adjusting unit 60. The position of the trapezoidal screw nut 63 is precisely detected by a detection piece 72 provided in the trapezoidal screw nut 63 and a position sensor 73 attached to a support member 74 fixedly arranged on the fixed die plate 2, and the position is displayed on a display panel (not shown).

A mold opening/closing unit that moves the movable die plate 3 over a large distance in a mold-opening direction is provided in parallel to a traveling direction of the movable die plate 3 and is supported rotatably by a bearing box 17 and a bearing box 18 attached on the base 1 so that an axis direction is constrained. The mold opening/closing unit is configured by: a ball screw shaft 13 driven by a servo motor 15 via a power transmission belt 16; and a ball screw nut 14 that is supported by a bracket 3a fixed below the movable die plate 3, which is screwed into the ball screw shaft 13, and which linearly moves as a result of rotation of the ball screw shaft 13. The number of rotations and rotation speed of the ball screw shaft 13 are controlled by a control device 37 via the servo motor 15.

In this mold clamping device, from a state that the mold in FIG. 1 is opened, that is, a state that the movable die plate 3 is sufficiently separated from the fixed die plate 2, as shown by a two-dot chain line, to a state that the mold 4 and the mold 5 are closed, as shown by a solid line, the movable die plate 3 moves by rotation of the ball screw shaft 13 driven by the servo motor 15. A mold-platen-moving-speed control circuit contained in the control device 37 slowly accelerates the movable die plate 3, and after a movement at constant speed, decelerates it and stops immediately before the mold 5 comes into contact with the mold 4.

In the present embodiment, the drive unit 50 is fixed on the movable die plate 3, and the die-plate-interval adjusting unit 60 is fixed on the fixed die plate 2. However, the drive unit 50 can be attached on the fixed die plate 2 and the die-plate-interval adjusting unit 60 can be attached on the movable die plate 3.

A hydraulic system that causes a movement or the like of the movable die plate 3 for clamping and for foaming and expanding is described. In FIG. 1, a hydraulic control circuit of the clamping cylinder 9 is configured by: the control device 37; a motor 32 for driving a hydraulic pump; a hydraulic pump 31; an electromagnetic-proportional-control relief valve 36 capable of switching a hydraulic pressure of an activation oil forwarded from the hydraulic pump 31 into two levels, that is, a high pressure and a low pressure; a four-direction switching valve 34; a three-direction switching valve 33 capable of switching a channel piping 26 that simultaneously transmits an activation oil to the hydraulic cylinder and the sub-cylinder 9a on the clamping side and a channel piping 27 that transmits the same solely to the sub-cylinder 9a; an on/off valve 38; and an on/off valve 35 that is provided in a differential circuit piping 83 connecting a clamping-side piping 81 and a mold releasing-side piping 82.

A hydraulic system that controls the drive unit 50 is described. The activation oil forwarded from the hydraulic pump 31 is switched to a low pressure at the electromagnetic-proportional-control relief valve 36 and is transmitted via a low pressure-side piping 84 to the four-direction switching valve 44. The activation oil to be switched at the four-direction switching valve 44 is transmitted to the hydraulic cylinder 51 for a core back so that the ram 53 is activated in a push-pull manner. Through an activation oil channel on a side toward which the activating rod 54 is pressed by the ram 53, a hydraulic adjusting valve 45 that adjusts the activation hydraulic pressure is provided.

With reference to process diagrams of foam-expansion of a molded product within a cavity 25 after a resin is injected and filled within the cavity 25 (FIGS. 3 to 6), a core-back operation is described.

(Process I) close Split Nut, clamp, and Inject: FIG. 3

The movable die plate 3 is mold-closed by the ball screw shaft 13 shown in FIG. 1, the tie bars 7 are engaged with the half nuts 11 in a plurality of ring grooves 7a for fixation, the high pressure oil is transmitted via the three-direction switching valve 33 on the clamping side of the clamping cylinder 9, and by opening the on/off valve 38, transmitted to the sub-cylinder 9a having a smaller radius, the clamping is performed, and the molten resin is injected within the mold cavity 25.

Figure 4:
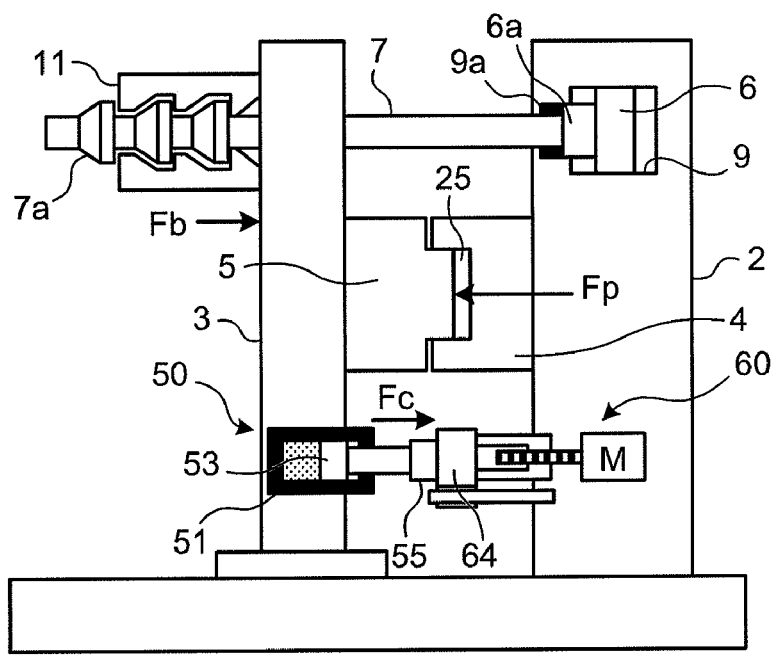
FIG. 4 depicts a core-back operation in the foaming and expanding process of the injection-foam molding device in FIG. 1 (Process II).

(Process II) Decrease Pressure of clamping Cylinder, Advance Core-Back Hydraulic Cylinder, and Abut to Adjusting Nut: FIG. 4

The electromagnetic-proportional-control relief valve 36 is operated to decrease the hydraulic pressure of the clamping hydraulic circuit to a low pressure, the three-direction switching valve 33 is switched, the on/off valve 38 is closed, the low pressure oil is transmitted to the sub-cylinder 9a to eliminate a play of an engaging unit between the respective tie bars 7 and half nuts 11, and a backup force Fb as a weak back pressure is applied to the mold. Simultaneously, the four-direction switching valve 44 is switched to transmit the activation oil to the hydraulic cylinder 51 for a core back, and each of the ram 53 is advanced so that the rod end piece 55 is abutted to the nut end piece 64 of the die-plate-interval adjusting unit 60.

In this case, there are relationships of Fb>Fp, Fb<Fc, Fb<Fp+Fc, where Fb denotes a backup force, Fp denotes a foaming force, and Fc denotes a core-back force.

Figure 5:
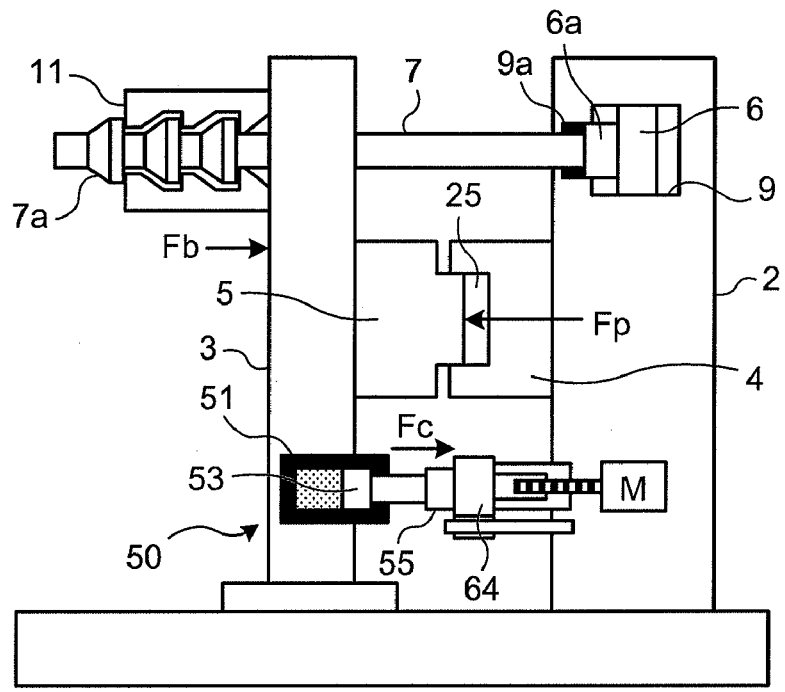
FIG. 5 depicts a core-back operation in the foaming and expanding process of the injection-foam molding device in FIG. 1 (Process III).

(Process III) Advance Core-Back Hydraulic Cylinder Simultaneously of Foaming and Expanding, Hold Position, and Cool: FIG. 5

As a result of foaming and expanding the resin, the foaming force Fp is applied to the mold. At this time, when Fb>Fp is established, where Fc denotes the core-back force, there is no possibility that a space is generated between the resin and the mold within the cavity 25. Simultaneously of foaming and expanding the resin, the activating rod 54 of the hydraulic cylinder 51 for a core back is advanced while abutting the rod end piece 55 to the nut end piece 64 of the die-plate-interval adjusting nut 60. At this time, when Fb<Fc or Fb<Fp+Fc is established, the hydraulic cylinder 51 for a core back overcomes the back pressure of the sub-ram 6a, and as a result, the mold can be opened. To achieve such relative force conditions, the hydraulic pressure supplied to the sub-cylinder 9a is adjusted according to the foaming force of the resin, and the hydraulic pressure to the hydraulic cylinder 51 for a core back is adjusted by the hydraulic adjusting valve 45. The activating rod 54 then advances and the ram 53 that is forced to reach a stroke end of the cylinder 51 stops. The interval between the molds is held and cooled in a state that the resin expansion force is left, and thus the resin is solidified.

That is, when Fb<Fp+Fc is established, the operation stops at the advancing stroke end of the core-back hydraulic cylinder. Even when advancement is attempted when Fb>Fp is established, a stopper is activated because of Fc>Fb, thereby holding a position of the interval between the molds.

Figure 6:
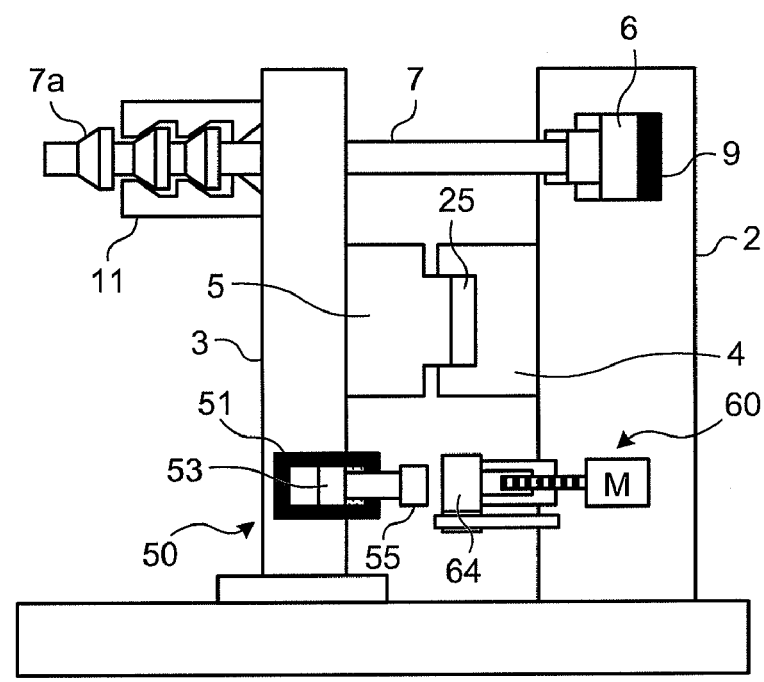
FIG. 6 depicts a core-back operation in the foaming and expanding process of the injection-foam molding device in FIG. 1 (Process IV).

(Process IV) Retract Hydraulic Cylinder for Core Back, Mold-Releasing, and Mold-Opening: FIG. 6

The four-direction switching valve 44 is switched so that the ram 53 of the hydraulic cylinder 51 for a core back is retracted to an opposite-side stroke end. Subsequently, the four-direction switching valve 34 is switched and the on/off valve 35 is opened, the clamping cylinder 9 is switched to the differential hydraulic circuit that activates on the mold-release side, and the mold-release is performed. Thereafter, the ball screw shaft 13 is driven so that the operation is moved to the mold-opening and extraction of the molded product.

In a case of a molded product having a thin thickness, an amount of a core back movement is small, and moving speed of the mold needs to be controlled so that a foaming and expanding speed of a resin is not exceeded. To do this, a resin pressure within the mold cavity 25 can be measured by using an in-mold pressure sensor 28 and the moving speed of the mold can be feedback-controlled so that the resin pressure is a constant value to make sure that the resin pressure does not reach a negative value; the foaming and expanding speed of a resin can be evaluated through previous calculation or actual measurement and the flow speed of the activation oil transmitted to the hydraulic cylinder 51 for a core back can be determined so that the flow speed falls below the evaluated speed.

Further, to achieve a highly accurate thickness dimension of the molded product, the core-back stop position after the foaming and expanding needs to be strict. To achieve this, the ram 53 of the hydraulic cylinder 51 for a core back is configured to stop at the stroke end, and thus a position of an abutment surface of the rod end piece 55 is constant all the time, and thus the adjustment position accuracy of the trapezoidal screw nut 63 of the die-plate-interval adjusting unit 60 becomes important. Moreover, the die plate or the mold loaded to the interval adjusting unit 60 is very heavy, and loads applied to the trapezoidal screw nut 63 and the trapezoidal screw shaft 62 are also heavy. That is, the trapezoidal screw is selected because of not only its accuracy but also durability to withstand the heavy load.

The trapezoidal screw shaft 62 is supported by the bearing 66 during rotation. However, when a heavy load is applied to a pressing surface of the nut end piece 64, this load is received by a flange 62a of the trapezoidal screw shaft 62 and a thrust washer 65 attached to the screw shaft support frame 61 and the bearing 66 is configured to avoid an excessive load by a ball, the clearance of a race, and deformation.

Moreover, the detection piece 72 attached to an arm 63a integrated with the trapezoidal screw nut 63 is detected by the highly accurate position sensor 73 to enable confirmation of the stop position of the die plates. When a detection value of the position sensor 73 is changed with time, the trapezoidal screw shaft 62 can be driven by a servo motor 58 to make a correction.

Thus, in the present embodiment, when foaming the molten foamable resin injected and filled in the mold cavity by slightly opening (core back) it in the mold, the hydraulic cylinder 51 as a drive unit that widens the interval between both of the die plates is controlled in activation speed so that it is driven to the activation end in a manner that the expanding speed of the resin foam molding is not exceeded. Thereby, the rod end piece 55 of the activating rod 54 is pressed against the nut end piece 64 of the trapezoidal screw nut 63 of the die-plate-interval adjusting unit 60 of which the position is previously set. In this way, the movable die plate 3 moves over a distance previously adjusted and set by the die-piece-interval adjusting unit 60, and as a result, the inner-side interval of the mold cavity is determined, thereby providing an accurate molded product.

Moreover, when foaming by slightly opening (core back) the mold, to eliminate the play of the half nut 11 supporting the pulling force of the tie bar 7 that clamps both of the die plates 3 and 2, a low hydraulic pressure is supplied to the sub-cylinder 9a having a smaller radius provided in the clamping cylinder 9, thereby pulling by a force smaller than that of the hydraulic cylinder 51 for a core back. As a result, the reproducibility of the set distance between the die plates becomes high, thereby providing an effect that a molded product having a high accuracy is obtained.

Second Embodiment

In a second embodiment provides an interval adjusting unit in the injection foam molding machine of a fourth unit according to claim 4 mentioned above. The interval adjusting unit differs from that of the first embodiment in that a trapezoidal screw shaft is not rotated and a trapezoidal screw nut is rotated and driven to move the trapezoidal screw shaft of which the rotation direction is constrained, thereby adjusting the interval between die plates.

The second embodiment is explained with reference to the drawings.

Figure 7:
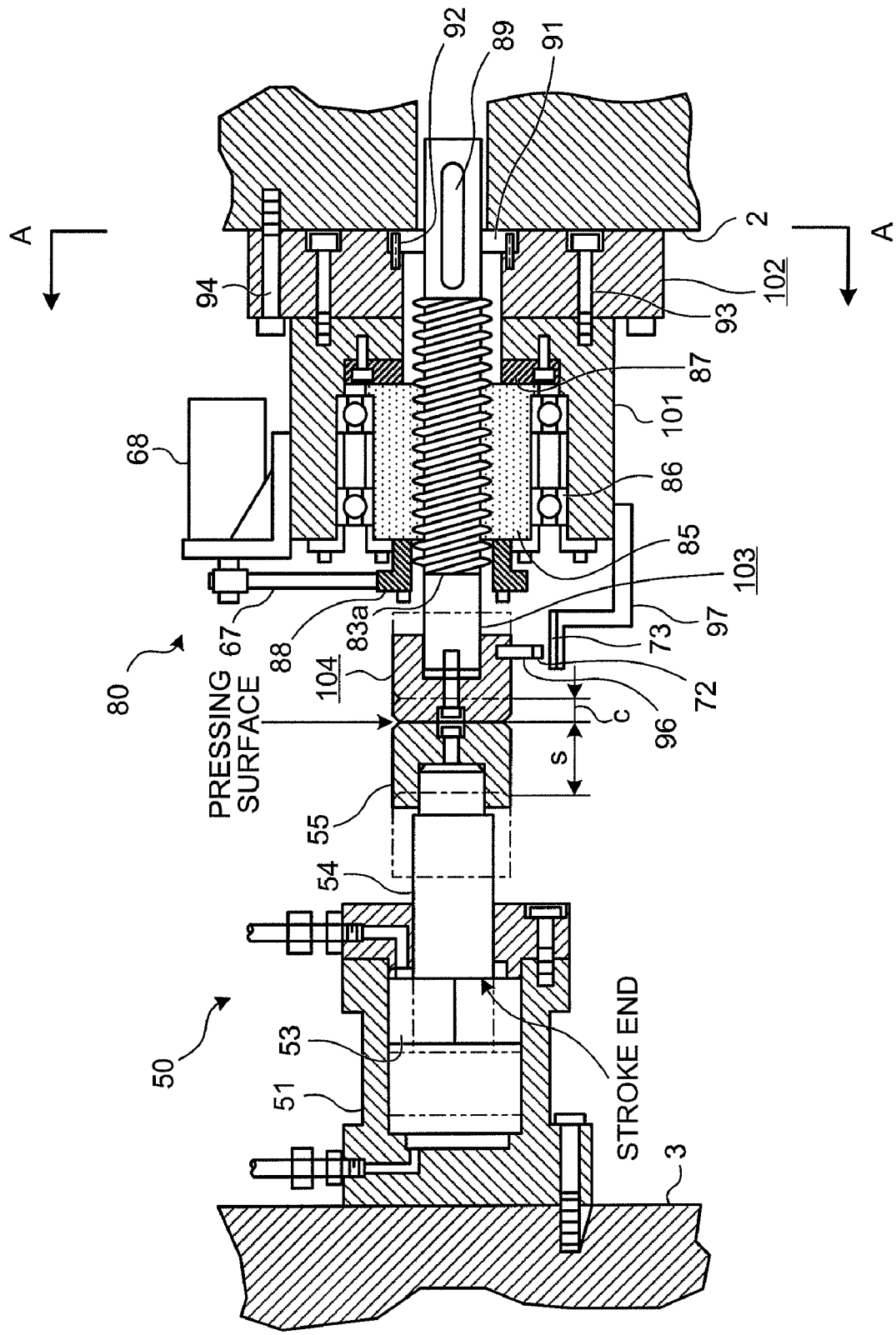
FIG. 7 depicts a drive unit formed by a hydraulic cylinder for a core back and a die-plate-interval adjusting unit according to a second embodiment.
Figure 8:
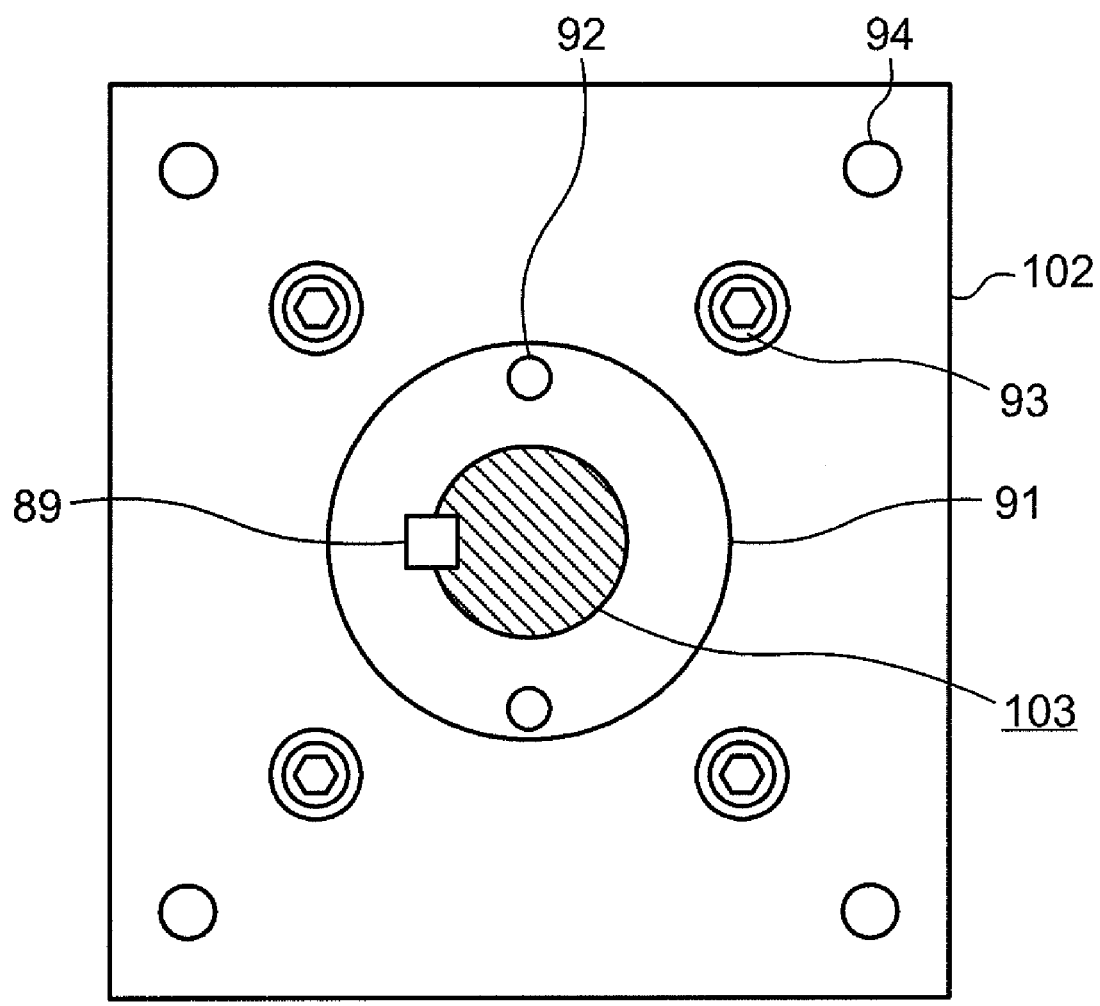
FIG. 8 depicts an A-A cross section in FIG. 7.

FIG. 7 depicts a drive unit formed by a hydraulic cylinder for a core back and a die-plate-interval adjusting unit according to the second embodiment, and FIG. 8 depicts an A-A cross section in FIG. 7.

To slightly open the interval between the fixed die plate 2 and the movable die plate 3 during foam molding, the drive unit 50 and a die-plate-interval adjusting unit 80 are used. As shown in FIG. 7, the drive unit 50 is the same as that in the first embodiment, and similarly to that in the first embodiment, a plurality (four sets) of the drive units 50 are fixed at positions symmetrical with respect to a surface facing the fixed die plate 2 of the movable die plate 3, and the ram 53 of the hydraulic cylinder 51 for a core back is driven by a predetermined distance (s) to the activation end of the hydraulic cylinder 51. Except for the die-plate-interval adjusting unit 80, the configuration and operations are similar to those in the first embodiment, and thus in the present embodiment, only the die-plate-interval adjusting unit 80 and relevant parts thereof are described, and descriptions of other components will be omitted.

The die-plate-interval adjusting unit 80 is configured by: a trapezoidal screw nut 85 including a trapezoid-shaped female screw; a screw nut support frame 101 that rotatably supports the trapezoidal screw nut 85 via two sets of bearings 86; a partition table 102 that is fixed to the screw nut support frame 101 by a plurality of bolts 93 and fixed to the fixed die plate 2 by a plurality of bolts 94; a trapezoidal screw shaft 103 including a trapezoidal screw screwed into the trapezoidal screw nut 85; a screw shaft end piece 104 being fixed at the leading end of the trapezoidal screw shaft 103 and having a surface abutted to the rod end piece 55 at the leading end of the activating rod 54 of the hydraulic cylinder 51 for a core back; a thrust washer 87 flanked between the trapezoidal screw nut 85 and the screw nut support frame 101; a detent plate 91 being fitted to a cylindrical stepped hole of the partition table 102 to effect detent by the partition table 102 and a pin 92 and having a key groove slidably engaged with a key 89 implanted in the trapezoidal screw shaft 103; and the servo motor 68 that rotates and drives the trapezoidal screw nut 85 via a belt pulley 88 and the toothed belt 67 fixed to the trapezoidal screw nut 85.

Reference letter c shown in FIG. 7 indicates an interval adjusting range of the die-plate-interval adjusting unit 80. The position of the trapezoidal screw shaft 103 is precisely detected by the detection piece 72 provided in an arm 96 fixed to the screw shaft end piece 104 and the position sensor 73 attached to a support member 97 fixedly arranged to the screw nut support frame 101, and the position displayed on a display panel (not shown).

The die-plate-interval adjusting unit 80 is fixed to a position facing the drive unit 50, on a surface of the fixed die plate 2. The screw shaft end piece 104 at the leading end of the trapezoidal screw shaft 103 of the die-plate-interval adjusting unit 80 is abutted to the rod end piece 55 at the leading end of the activating rod 54 of the hydraulic cylinder 51 for a core back and when it is further pressed, the ram 53 is stopped at an activation end of the hydraulic cylinder 51. In this way, the interval between both of the die plates is determined. In FIG. 4, the drive unit 50 is attached to a surface of the movable die plate 3 and the die-plate-interval adjusting unit 80 is attached to a surface of the fixed die plate 2. On the contrary, the drive unit 50 can be attached to the surface of the fixed die plate 2 and the die-plate-interval adjusting unit 80 can be attached to the surface of the movable die plate 3.

To achieve a highly accurate thickness dimension of the molded product, the core-back stop position after the foaming and expanding needs to be strict. To achieve this, the ram 53 of the hydraulic cylinder 51 for a core back is configured to stop at the stroke end, and thus a position of an abutment surface of the rod end piece 55 is constant all the time, and thus the adjustment position accuracy of the trapezoidal screw shaft 103 of the die-plate-interval adjusting unit 80 becomes important. The die plate or the mold loaded to the interval adjusting unit 80 is very heavy, and loads applied to the trapezoidal screw nut 85 and the trapezoidal screw shaft 103 are also heavy. That is, the trapezoidal screw is selected because of not only its accuracy but also durability to withstand the heavy load.

The trapezoidal screw nut 85 is supported by the bearing 86 during rotation. However, when a heavy load is applied to the pressing surface of the screw shaft end piece 104, this load is received by the thrust washer 87 attached between an end surface of the trapezoidal screw nut 85 and the screw nut support frame 101, and the bearing 86 is configured to avoid an excessive load by a ball, the clearance of a race, and deformation.

Thus, in the present embodiment, when foaming the molten foamable resin injected and filled in the mold cavity by slightly opening (core back) it in the mold, the hydraulic cylinder 51 as a drive unit that widens the interval between both of the die plates is controlled in activation speed so that it is driven to the activation end in a manner that the expanding speed of the resin foam molding is not exceeded. In this way, the rod end piece 55 of the activating rod 54 is pressed against the screw shaft end piece 104 of the trapezoidal screw shaft 103 of the die-plate-interval adjusting unit 80 of which the position is previously set, and thus the movable die plate 3 moves over a distance previously adjusted and set by the die-piece-interval adjusting unit 60. Thus, the inner-side interval of the mold cavity is determined, thereby providing an accurate molded product.

Industrial Applicability

As described above, in the injection foam molding machine and the injection foam molding method according to the present invention, a foamable molten resin injected and filled within a mold cavity is foamed by slightly opening a mold to obtain a highly accurate foam-molded product, and the machine and the method are suitable for the use in injection molding.

The invention claimed is:

1. An injection foam molding machine comprising:
   a clamping unit that moves a movable die plate relative to a fixed die plate and clamps the die plates;
   a fixed side mold attached to the fixed die plate;
   a movable side mold attached to the movable die plate;
   a plurality of drive units that widen an interval between the die plates; and
   a die-plate-interval adjusting unit that adjusts a distance over which the movable die plate is moved by the drive units, wherein
   the drive units, which are hydraulic cylinders with which a ram is driven to an activation end, are fixed to the fixed die plate or the movable die plate, the die-plate-interval adjusting unit is fixedly provided on an alternate one of the die plates at a position facing the drive units, and an adjustment end of the interval adjusting unit is abutted to a leading end of an activating rod of the hydraulic cylinders of the drive units, thereby determining the interval between both of the die plates.

2. The injection foam molding machine according to claim 1, wherein the die-plate-interval adjusting unit includes:
   a screw shaft support frame fixed to one of the die plates on which the drive units are not attached;
   a trapezoidal screw shaft that is rotatably supported by the screw shaft support frame, constrained in a center-line direction, and includes a trapezoidal screw; and
   a trapezoidal screw nut that has a surface abutted to the leading end of the activating rod of the hydraulic cylinder, includes a trapezoid-shaped female screw screwed to the trapezoidal screw of the screw shaft, and is provided with a detent.

3. The injection foam molding machine according to claim 1, wherein
   the die-plate-interval adjusting unit includes:
   a screw nut support frame fixed to a die plate on which the drive units are not attached;
   a trapezoidal screw nut that is rotatably supported by the screw nut support frame, constrained in a center-line direction, and includes a trapezoidal screw; and
   a trapezoidal screw shaft that has a surface abutted to the leading end of the activating rod of the hydraulic cylinder, includes a trapezoid-shaped male screw screwed into the trapezoidal screw of the screw nut, and is provided with a detent.

4. The injection foam molding machine according to claim 1, wherein
   the die-plate-interval adjusting unit includes:
   a screw shaft support frame fixed to a die plate on which the drive units are not attached;
   a trapezoidal screw shaft that is rotatably supported by the screw shaft support frame, constrained in a center-line direction, and includes a trapezoidal screw; and
   a trapezoidal screw nut that has a surface abutted to the leading end of the activating rod of the hydraulic cylinder, includes a trapezoid-shaped female screw screwed into the trapezoidal screw of the screw shaft, and is provided with a detent, and
   in the interval adjusting unit that adjusts the interval between both of the die plates, a servo motor that rotates and drives the trapezoidal screw shaft is provided.

5. The injection foam molding machine according to claim 1, wherein
   the die-plate-interval adjusting unit includes:
   a screw nut support frame fixed to a die plate on which the drive units are not attached;
   a trapezoidal screw nut that is rotatably supported by the screw nut support frame, constrained in a center-line direction, and includes a trapezoidal screw; and
   a trapezoidal screw shaft that has a surface abutted to the leading end of the activating rod of the hydraulic cylinder, includes a trapezoid-shaped male screw screwed into the trapezoidal screw of the screw nut, and is provided with a detent, and
   in the interval adjusting unit that adjusts the interval between both of the die plates, a servo motor that rotates and drives the trapezoidal screw shaft is provided.

6. The injection foam molding machine according to claim 1, comprising:
   a fixed die plate fixed to a base; a movable die plate movable on the base relative to the fixed die plate; a movable-die-plate moving unit that reciprocally moves the movable die plate; a plurality of hydraulic clamping cylinders adjunctly attached to the fixed die plate;
   a plurality of drive units capable of widening an interval between both of the die plates after clamping the movable die plate by supplying a low hydraulic pressure to a small sub-cylinder provided in a clamping cylinder to eliminate a play of a half nut that supports a pulling force of a tie bar that clamps both of the die plates; and a plurality of die-plate-interval adjusting units that adjust a distance over which the movable die plate is moved by the drive units, wherein the drive units, which are hydraulic cylinders with which a ram is driven to an activation end, are fixed to the fixed die plate or the movable die plate, the die-plate-interval adjusting unit is fixedly provided on an alternate one of the die plates at a position facing the drive units, and an adjustment end of the interval adjusting unit is abutted to a leading end of an activating rod of the hydraulic cylinders of the drive units, thereby determining the interval between both of the die plates each of the die-plate-interval adjusting unit includes: a screw shaft support frame fixed to a die plate on which the drive units are not attached; a trapezoidal screw shaft that is rotatably supported by the screw shaft support frame, constrained in a center-line direction, and includes a trapezoidal screw; and a trapezoidal screw nut that has a surface abutted to the leading end of the activating rod of the hydraulic cylinder, includes a trapezoid-shaped female screw screwed into the trapezoidal screw of the screw shaft, and is provided with a detent.

7. An injection foam molding method comprising:

a process of injecting and filling a molten resin within a mold cavity formed between a fixed side mold and a movable side mold using the injection foam molding machine according to claim 6; and a process of moving the movable side mold in a direction from which the fixed side mold is separated after the process of injecting and filling.

8. An injection foam molding method, in which by using the injection foam molding machine according to claim 6, a foamable resin compressed by plasticizing by melting within a mold cavity that has been clamped is injected and filled, and thereafter a resin pressure is decreased, and a volume of the mold cavity is increased to mold a foam-molded product, wherein after injecting and filling the foamable resin, when hydraulic cylinders of the drive units are driven to press a pressing surface of a trapezoidal screw nut of the interval adjusting unit, activation speed of the hydraulic cylinders is controlled such that expanding speed of foaming and molding of a resin is not exceeded, a movable die plate moves over a distance adjusted and set by the interval adjusting unit and stops, and subsequent to ending foaming, foam pressure holding, cooling, pressure decreasing, and mold-releasing are performed.

9. An injection foam molding method comprising:

a process of injecting and filling a molten resin within a mold cavity formed between a fixed side mold and a movable side mold using the injection foam molding machine according to claim 6; and a process of moving the movable side mold in a direction from which the fixed side mold is separated after the process of injecting and filling, wherein an in-mold pressure sensor that detects a molten resin pressure within the mold cavity is provided and an activation hydraulic pressure of a hydraulic cylinder of the drive unit is controlled such that an in-mold pressure during a resin foam-molding process within the mold cavity does not become a negative pressure.

10. The injection foam molding machine according to claim 1, comprising:

a fixed die plate fixed to a base; a movable die plate movable on the base relative to the fixed die plate; a movable-die-plate moving unit that reciprocally moves the movable die plate; a plurality of hydraulic clamping cylinders adjunctly attached to the fixed die plate;

a plurality of drive units capable of widening an interval between both of the die plates after clamping the movable die plate by supplying a low hydraulic pressure to a small sub-cylinder provided in a clamping cylinder to eliminate a play of a half nut that supports a pulling force of a tie bar that clamps both of the die plates; and a plurality of die-plate-interval adjusting units that adjust a distance over which the movable die plate is moved by the drive units, wherein the drive units, which are hydraulic cylinders with which a ram is driven to an activation end, are fixed to the fixed die plate or the movable die plate, the die-plate-interval adjusting unit is fixedly provided on an alternate one of the die plates at a position facing the drive units, and an adjustment end of the interval adjusting unit is abutted to a leading end of an activating rod of the hydraulic cylinders of the drive units, thereby determining the interval between both of the die plates each of the die-plate-interval adjusting unit includes: a screw nut support frame fixed to a die plate on which the drive units are not attached; a trapezoidal screw nut that is rotatably supported by the screw nut support frame, constrained in a center-line direction, and includes a trapezoidal screw;

and a trapezoidal screw nut that has a surface abutted to the leading end of the activating rod of the hydraulic cylinder, includes a trapezoid-shaped male screw screwed into the trapezoidal screw of the screw nut, and is provided with a detent.

11. An injection foam molding method comprising:

a process of injecting and filling a molten resin within a mold cavity formed between a fixed side mold and a movable side mold using the injection foam molding machine according to claim 10; and a process of moving the movable side mold in a direction from which the fixed side mold is separated after the process of injecting and filling.

12. An injection foam molding method, in which by using the injection foam molding machine according to claim 10, a foamable resin compressed by plasticizing by melting within a mold cavity that has been clamped is injected and filled, and thereafter a resin pressure is decreased, and a volume of the mold cavity is increased to mold a foam-molded product, wherein after injecting and filling the foamable resin, when hydraulic cylinders of the drive units are driven to press a pressing surface of a trapezoidal screw shaft of the interval adjusting unit, activation speed of the hydraulic cylinders is controlled such that expanding speed of foaming and molding of a resin is not exceeded, a movable die plate moves over a distance adjusted and set by the interval adjusting unit and stops, and subsequent to ending foaming, foam pressure holding, cooling, pressure decreasing, and mold-releasing are performed.

13. An injection foam molding method comprising:

a process of injecting and filling a molten resin within a mold cavity formed between a fixed side mold and a movable side mold using the injection foam molding machine according to claim 10; and a process of moving the movable side mold in a direction from which the fixed side mold is separated after the process of injecting and filling, wherein an in-mold pressure sensor that detects a molten resin pressure within the mold cavity is provided and an activation hydraulic pressure of a hydraulic cylinder of the drive unit is controlled such that an in-mold pressure during a resin foam-molding process within the mold cavity does not become a negative pressure.

14. An injection foam molding machine, wherein a plurality of position sensors that detect a distance between a mold attaching surface of the die plate according to claim 1 and a leading end surface of a trapezoid-shaped female screw of a plurality of interval adjusting units are provided; and a value of the detection is displayed on a display panel.

* * * * *